United States Patent [19]

Miyano et al.

[11] Patent Number: 5,881,358
[45] Date of Patent: Mar. 9, 1999

[54] COMPOSITION FOR EXTRACTING TRANSITION METAL AND METHOD FOR EXTRACTING TRANSITION METAL USING THE SAME

[75] Inventors: Sotaro Miyano; Nobuhiko Iki; Fumitaka Narumi; Naoya Morohashi, all of Miyagi; Hitoshi Kumagai, Saitama, all of Japan

[73] Assignees: Cosmo Research Institute, Tokyo, Japan; Cosmo Oil Co., Ltd., Tokyo, Japan

[21] Appl. No.: 998,426

[22] Filed: Dec. 24, 1997

[30] Foreign Application Priority Data

Dec. 26, 1996 [JP] Japan ..................................... 8-356340
Oct. 17, 1997 [JP] Japan ..................................... 9-299594

[51] Int. Cl.⁶ ............................. C22B 60/00; C22B 3/00; C22B 11/00; C01F 17/00
[52] U.S. Cl. ................................. 423/8; 423/9; 423/21.5; 423/22; 423/24; 423/49; 423/54; 423/63; 423/70; 423/99; 423/139
[58] Field of Search ................................. 423/8, 9, 21.5, 423/22, 24, 49, 54, 63, 70, 99, 139, DIG. 14; 210/634, 638

[56] References Cited

FOREIGN PATENT DOCUMENTS 731102   9/1996   European Pat. Off. .

OTHER PUBLICATIONS

Hitoshi Kumagai, et al. "Facile Synthesis of p–tert–Butylthiacalix[4]arene by . . . in the Presence of a Base" Tetrahedron Lett. 38(22), pp. 3971–3972, Jun. 1997.

Tyo Sone, et al. "Synthesis and Properties of Sulfur–Bridged Analogs of p–tert–Butylcalix[4]arene" Tetrahedron, 53(31), pp. 10689–10698, Aug. 1997.

M. Cariou, et al. "Anodic oxidation of methoxylated dibenzothiophenes: isolation of stable cation radical salts" New J. Chem., 19(1), 65–76, Jan. 1995.

*Primary Examiner*—Steven Bos
*Attorney, Agent, or Firm*—Sughrue, Mion, Zinn, Macpeak & Seas, PLLC

[57] ABSTRACT

A composition for extracting a transition metal which comprises as an active ingredient a cyclic phenol sulfide represented by the following formula (1):

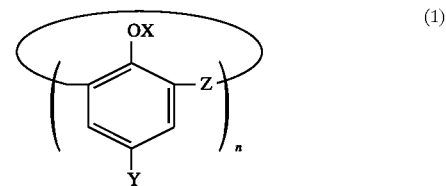

wherein X represents a hydrogen atom, a hydrocarbon group, an acyl group, a carboxyalkyl group, or a carbamoylalkyl group; Y represents a hydrocarbon group; Z represents a sulfide group, a sulfinyl group, or a sulfonyl group; and n is an integer of 4 to 8; and a method for extracting a transition metal using the composition

14 Claims, No Drawings

COMPOSITION FOR EXTRACTING TRANSITION METAL AND METHOD FOR EXTRACTING TRANSITION METAL USING THE SAME

FIELD OF THE INVENTION

The present invention relates to a novel extracting composition for extracting a transition metal and a method for extracting a transition metal using the composition.

BACKGROUND OF THE INVENTION

The transition metals include the nine metals of Group VIII of the periodic table, as representative examples thereof, and the lanthanide and actinide metals. The transition metals further include the metals called rare metals, noble metals, and heavy metals. Specific examples thereof include iron (Fe), cobalt (Co), nickel (Ni), ruthenium (Ru), rhodium (Rh), palladium (Pd), osmium (Os), iridium (Ir), platinum (Pt), titanium (Ti), vanadium (V), chromium (Cr), manganese (Mn), copper (Cu), zinc (Zn), yttrium (Y), zirconium (Zr), niobium (Nb), molybdenum (Mo), silver (Ag), cadmium (Cd), lanthanum (La), cerium (Ca), neodymium (Nd), samarium (Sm), europium (Eu), gadolinium (Gd), terbium (Tb), holmium (Ho), erbium (Er), thulium (Tm), ytterbium (Yb), lutetium (Lu), hafnium (Hf), tantalum (Ta), tungsten (W), gold (Au), mercury (Hg), uranium (U), and plutonium (Pu). These transition metals are used not only in catalysts and iron/steels but also in a wide variety of other applications such as hydrogen-absorbing alloys, batteries, magnets, and superconductive materials. These metals are desired to be recovered from so-called secondary resources from the standpoint of stable supply. Furthermore, it in necessary to treat industrial drainage and the like to remove the metals contained therein in slight amounts. Thus, the establishment of an efficient metal recovery technique is an important subject also from the standpoint of environmental protection.

One of the elemental techniques for the recovery and purification of transition metals is the solvent extraction method.

The solvent extraction method has conventionally employed an acid, basic, or neutral extracting agent according to the composition of the solution to be treated. Examples of the extracting agent include di(2-ethylhexyl) phosphoric acid, E-2-hydroxy-5-nonylbenzophenone oxime, 8-hydroxy-7-(1-nonyl-2-propenyl)quinoline, trialkylmethylammonium salts, and tributyl phosphate. The extracting agents are commercially available, for example, under the trade names of D2EHPA (Kao Corp., Daihachi Chemical Industry Co., Ltd.), Lix 65N (General Mills), Kelex 120 (Ashland Chemical), and Aliquat 336 (Ashland Chemical).

Besides being used alone, transition metals have recently come to be used as composites and similar materials such as alloys and mixtures. It is hence thought that the solvent extraction method comes to be utilized increasingly. There is a desire for an extracting agent which has higher extraction capacity, higher extraction rate, and higher selectivity and is harmless and inexpensive.

SUMMARY OF THE INVENTION

An object of the present invention is to provide an extracting agent for a transition metal which has a novel structure entirely different from the structure of any known extracting agent for a transition metal and has excellent extracting performance.

Another object of the present invention is to provide a method for extracting a transition metal with the extracting agent.

These and other objects of the present invention have been accomplished by a composition for extracting a transition metal which comprises as an active ingredient a cyclic phenol sulfide represented by the following formula (1):

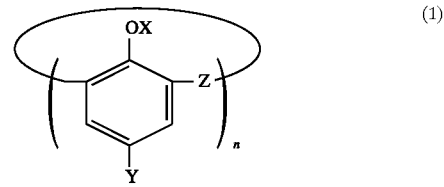

wherein X represents a hydrogen atom, a hydrocarbon group, an acyl group, a carboxyalkyl group, or a carbamaylalkyl group; Y represents a hydrocarbon group; Z represents a sulfide group, a sulfinyl group, or a sulfonyl group; and n is an integer of 4 to 8, optionally together with a solvent or a carrier.

Furthermore, these and other objects of the present invention have been accomplished by a method for extracting a transition metal which comprises extracting a transition metal with the above-described composition for extracting a transition metal.

DETAILED DESCRIPTION OF THE INVENTION

Cyclic compounds such as cyclodextrins, crown ethers, and calixarenes are known to form various clathrate compounds. The present inventors thought there was the possibility that the cyclic phenol sulfides having a backbone containing at least four phenol frameworks and having a sulfide bond as shown in EP 0731102 A1 might have excellent extracting performance in the extraction of transition metals, and conducted intensive studies. As a result, they have found that a cyclic phenol sulfide represented by the above-described formula (1) has the high ability to extract transition metals. The present invention has boon completed based on this finding.

The cyclic phenol sulfide represented by formula (1) is an active ingredient in the composition for extracting a transition metal according to the present invention.

In formula (1), X represents a hydrogen atom, a hydrocarbon group, an acyl group, a carboxyalkyl group, or a carbamoylalkyl group.

The hydrocarbon group represented by X in not particularly limited in the number of carbon atoms thereof, as long an it contains at least one carbon atom. However, preferably, it has from 1 to 6 carbon atoms. Examples thereof include alkyl and alkenyl groups such as methyl, ethyl, n-propyl, isopropyl, n-butyl , n-pentyl, n-hexyl, vinyl, allyl, cyolohoxyl, and phenyl.

The acyl group represented by X is not particularly limited in the number of carbon atoms thereof, as long as it contains at least one carbon atom. However, preferably, it has from 1 to 7 carbon atoms. Examples thereof include a formyl group, an acetyl group, a propionyl group, a butyryl group, a valeryl group, an oxalyl group, a malonyl group, a succinyl group, a benzoyl group, an acryloyl group, a mathacryloyl group, and a crotonyl group.

The carboxyalkyl group represented by X is not particularly limited in the number of carbon atoms thereof, as long as it contains at least two carbon atom. However, preferably, it contains from 2 to 13 carbon atoms. Examples of thereof include —CH$_2$COOH, —CH$_2$CH$_2$COOH, —CH(CH$_3$)COOH, —CH$_2$CH$_2$CH$_2$COOH, and —C(CH$_3$)$_2$COOH.

The carbamoylalkyl group represented by X is not particularly limited in the number of carbon atoms thereof, as long as it contains at least two carbon atoms. However, preferably, it contains from 2 to 13 carbon atoms. Examples thereof include —CH$_2$CONH$_2$, —CH$_2$CH$_2$CONH$_2$, —CH(CH$_3$)CONH$_2$, —C(CH$_3$)$_2$CONH$_2$, —CH$_2$CONH(CH$_3$), and —CH$_2$CONHCH(CH$_3$)Ph.

In general, the extracting ability of the composition decreases with the increasing number of carbon atoms contained in the hydrocarbon, acyl; or carboxyalkyl groups represented by X.

Formula (1) contains 4 to 8 X's per molecule. Those plural X's may be the same or different.

In formula (1), Y represents a hydrocarbon group.

The hydrocarbon group represented by Y is not particularly limited in the number of carbon atoms thereof, as long as it contains at least one carbon atom. However, preferably, it contains from 1 to 30, more preferably from 1 to 18, carbon atoms. Examples thereof Include saturated aliphatic hydrocarbon groups, unsaturated hydrocarbon groups, alicyclic hydrocarbon groups, alicyclic-aliphatic hydrocarbon groups, aromatic hydrocarbon groups, and aromatic-aliphatic hydrocarbon groups.

Examples of the saturated aliphatic hydrocarbon groups include alkyl groups, such as methyl, ethyl, n-propyl, isopropyl, n-butyl, isobutyl, tert-butyl, n-pentyl, neopentyl, n-hexyl, n-octyl, tert-octyl, n-nonyl, isononyl, and n-dodecyl; and groups comprising polymers or copolymers of ethylene, propylono, or butylene.

Examples of the unsaturated aliphatic hydrocarbon groups include alkanyl groups much as vinyl, allyl, isoproponyl, and 2-butenyl; and groups comprising polymers or copolymers of acetylene, butadiene, or isoprene.

Examples of the alicyclic hydrocarbon groups include cycloalkyl and cycloalkanyl groups, such as cyclohexyl, methylcyclohexyl, and ethylcyclohexyl.

Examples of the alicyclic-aliphatic hydrocarbon groups include alkyl and alkenyl groups substituted with at least one of cyaloalkyl and cycloalkenyl groups, such as cyclohexylmothyl and cyclohexylethyl.

Examples of the aromatic hydrocarbon groups include aryl groups, such as phenyl and naphthyl; and alkylaryl groups, such as methylphanyl, dimethylphenyl, trimethylphenyl, ethylphenyl, and butylphenyl.

Examples of the aromatic-aliphatic hydrocarbon groups include aralkyl groups, such as benzyl, phenylethyl, phenylpropyl, phonylbutyl, and methylphenylethyl.

Formula (1) contains from four to eight Y's per molecule. These plural Y's may be the same or different.

In formula (1), Z represents a sulfide group, a sulfinyl group, or a sulfonyl group.

Formula (1) contains from four to eight Z's per molecule. Thesa Z's may ba the same or different.

In formula (1), n is an integer of 4 to 8, preferably 4 to 6, and more preferably 4, from the standpoint of suitability for the size of transition metals.

Processes for producing cyclic phenol sulfides represented by formula (1) described above will be explained below.

Examples of the production of cyclic phenol sulfides represented by formula (1) are described in EP 0731102 A1.

An appropriate example thereof is a process in which an alkylphenol having a hydrocarbon group at the 4-position and represented by formula (2):

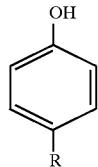

(2)

(wherein R in a hydrocarbon group) is allowed to react with an appropriate amount of elemental sulfur in the presence of an appropriate amount of at least one metallic reagent selected from alkali metal reagents and alkaline earth metal reagents. Examples of the hydrocarbon group represented by R are the same as those represented by Y.

The alkylphenol and elemental sulfur are fed to a reactor in such a proportion that the amount of elemental sulfur is 0.1 gram equivalent or more, preferably 0.35 gram equivalents or more, per gram equivalent of the alkylphanol. Although there is no particular upper limit on the feed amount of elemental sulfur, the amount thereof in preferably up to 20 gram equivalents, more preferably up to 10 gram equivalents, per gram equivalent of the alkylphenol.

Examples of the alkali metal reagents include elemental alkali metals, alkali metal hydrides, alkali metal hydroxides, alkali metal carbonates, alkali metal alkoxides, and alkali metal halides. Examples of the alkaline earth metal reagents include elemental alkaline earth metals, alkaline earth metal hydrides, alkaline earth metal hyroxides, alkaline earth metal oxides, alkaline earth metal carbonates, alkaline earth metal alkoxides, and alkaline earth metal halides.

The use amount of the alkali metal reagents or alkaline earth metal reagents is 0.005 gram equivalents or more, preferably 0.01 gram equivalent or more, per gram equivalent of the alkylphenol. Although there is no particular upper limit on the use amount of the alkali metal reagents or alkaline earth metal reagents, the amount thereof is preferably up to 10 gram equivalents, more preferably up to 5 gram equivalents.

The hydrogen atoms of the phenolic hydroxyl groups of the cyclic phenol sulfide obtained can be converted to the groups represented by X excluding a hydrogen atom in formula (1).

Examples of processes for this conversion are also described in EP 0731102 A1. An appropriate example thereof is a process in which the hydrogen atoms of the phenolic hydroxyl groups of the cyclic phenol sulfide are acylated with an acylating agent such an acetyl chloride. In another example, the hydrogen atoms of the phenolic hydroxyl groups of the cyclic phenol sulfide are substituted with an alkali metal, and then converted to a hydrocarbon group through a reaction with a halogenated hydrocarbon.

An appropriate example of the conversion to carboxyalkyl groups is described in, e.g., Japanese Patent Application No. 8-352619. In this process, the hydrogen atoms of the phenolic hydroxyl groups of the cyclic phenol sulfide are substituted with an alkali metal, and than substituted with a carboxyalkyl group by reacting the resultant sulfide with an alkoxycarbonylalkyl halide and than subjecting the reaction product to a known reaction, e.g., hydrolysis.

An appropriate example of the conversion to carbamoylalkyl groups comprises converting the carboxyalkyl groups into, e.g., an acid chloride, by a known method, and reacting the same with an amine.

Furthermore, the sulfide groups of the cyclic phenol sulfide obtained can be converted to the groups represented by Z excluding a sulfide group in formula (1).

Examples of processes for this conversion are described in Japanese Patent Application No. 8-255368. In an appropriate example thereof, the sulfide groups are oxidized with an oxidizing agent such as hydrogen peroxide or sodium perborate to thereby convert those groups to sulfinyl or sulfonyl groups.

A solution of the thus-obtained cyclic phenol sulfide represented by formula (1) is brought into contact with a solution containing transition metals dissolved therein, whereby the transition metals convert to the solution of the cyclic phenol sulfide and are thus extracted.

The solvent used for the solution of the cyclic phenol sulfide and that used for the transition metal solution are hardly miscible with each other.

Preferred in a combination of a water-insoluble solvent as the solvent for the solution of the cyclic phenol sulfide and water as the solvent for the transition metal solution. According to this combination, a solution of the cyclic phenol sulfide in a water-insoluble solvent is brought into contact with an aqueous solution containing transition metals dissolved therein, whereby the transition metals contained in the aqueous solution can be extracted.

Examples of the water-insoluble solvent include aromatic hydrocarbons (e.g., benzene, toluene, xylene); halogenated hydrocarbons (e.g., chloroform, carbon tetrachloride, chlorobenzene), aliphatic hydrocarbons (e.g., hexane, octane), and mineral oils (e.g., kerosene, gas oil).

The solvents may be used alone or as a mixture of two or more thereof.

The concentration of the cyclic phenol sulfide represented by formula (1) in the solution thereof is not particularly limited, provided that the upper limit thereof depends on the solubility of the cyclic phenol sulfide in the individual solvents. In general, the concentration thereof is from $1 \times 10^{-4}$ to 1M.

Besides the nine elements of Group VIII of the periodic table, the transition metals include the elements of Groups 3A to 7A and Groups 1B and 2B, that is, the elements ranging from scandium, having an atomic number of 21, to zinc, having an atomic number of 30, from yttrium, having an atomic number of 39, to cadmium, having an atomic number of 48, from lanthanum, having an atomic number of 57, to mercury, having an atomic number of 80, and from actinium, having an atomic number of 89, to lawrencium, having an atomic number of 103. Specifically, the transition metals include the elements of Group VIII, i.e., iron (Fe), cobalt (Co), nickel (Ni), ruthenium (Ru), rhodium (Rh), palladium (Pd), osmium (Os), iridium (Ir), and platinum (Pt), and further include titanium (Ti), vanadium (V), chromium (Cr), manganese (Mn), copper (Cu), zinc (Zn), yttrium (Y), zirconium (Zr), niobium (Nb), molybdenum (Mo), silver (Ag), cadmium (Cd), lanthanum (La), cerium (Ce), neodymium (Nd), samarium (Sm), europium (Eu), gadolinium (Gd), terbium (Tb), holmium (Ho), erbium (Er), thulium (Tm), ytterbium (Yb), lutetium (Lu), hafnium (Hf), tantalum (Ta), tungsten (W), gold (Au), mercury (Hg), uranium (U), and plutonium (Pu).

The solution to be extracted is not particularly limited in the concentration of transition metals dissolved therein. Even when the solution has a transition metal concentration as low as about $1.0 \times 10^{-5}$M, it can be sufficiently extracted.

Although the aqueous transition metal solution is not particularly limited in pH, it preferably has a pH of from 3 to 11. As the pH of the solution lowers to below 3, the degree of extraction tends to decrease. In this case, a longer extraction period is necessary.

The extraction temperature is not particularly limited an long as it is not higher than the boiling point of the solvent used. In general, a temperature around room temperature may be used.

The extraction operation is conducted by bringing a solution of the cyclic phenol sulfide into contact with a solution containing transition metals dissolved therein. This contacting is accomplished by shaking, stirring, etc. Although conditions for shaking or stirring are not particularly limited, vigorous shaking or agitation is more effective in efficient extraction. Shaking may be usually conducted at a frequency of about from 100 to 400 timres per minute.

An additive for accelerating the extraction (extraction accelerator) can be used.

Examples of the extraction accelerator include basic nitrogen-containing heterocyclic compounds and aromatic amino acids. Specific examples thereof include nitrogen-containing heterocyclic compounds, such as pyridine, alkylpyridinas (e.g., mathylpyridine, ethylpyridine), and quinoline; and amino acids containing an aromatic ring, such an tryptophan and phenylalanine. Examples of the extraction accelerator further include compounds which coordinate to transition metal ions and help the ions to associate with the cyclic phenol sulfide and which thus function to heighten the rate of complex formation with transition metal ions. However, pyridine and tryptophan are preferred.

Although the concentration of the extraction accelerator is not particularly limited, the amount thereof is preferably from 1 to 1,000 gram equivalents per gram equivalent of the transition metal ions to be extracted.

If the addition amount of the extraction accelerator is too small, the effect of accelerating extraction is not obtained. Conversely, if the amount thereof is too large, there is a fear that the accelerator may alter the properties of the solvent used an an organic phase.

The composition for extracting a transition metal of the present invention is useful for efficiently extracting transition metals.

The present invention will be explained below in more detail by reference to Production Examples and Examples, but the invention should not be construed as being limited to thereto in any way.

PRODUCTION EXAMPLE 1

To 45.2 g of 4-tert-butylphenol were added 14.4 g of elemental sulfur and 3.0 g of sodium hydroxide. In a nitrogen stream, the resultant mixture was gradually heated to 230° C. over a period of 4 hours with stirring and then continuously stirred for another 2 hours, during which operation the water and hydrogen sulfide obtained by the reaction were kept being removed. The water distilled off during the reaction amounted to about 0.8 g, while the hydrogen sulfide obtained by the reaction amounted to about 6 g. This reaction mixture was cooled to room temperature, dissolved in 500 ml of other, and then hydrolyzed with 1N aqueous sulfuric acid solution. The ether layer was separated from the aqueous layer and the other was removed therefrom by distillation. The reaction mixture thus obtained was subjected to separation by silica gel column chromatography (hexane/chloroform) to obtain a crude reaction product, which was recrystallized from chloroform/acetone. As a result, 4.32 g of 5, 11, 17, 23-tetra-tert-butyl-25, 26, 27, 28-tetrahydroxy-2, 8, 14, 20-tetrathia[$19.3.1.1^{3,7}1^{9,13}1^{15,19}$] octacosa-1(25), 3, 5, 7(28), 9, 11, 13(27), 15, 17, 19(26), 21, 23-dodecaene (I) was obtained as colorless transparent crystals.

This reaction product was the cyclic phenol sulfide represented by formula (1) wherein n=4, X=H, Y=t-butyl, and Z=S.

PRODUCTION EXAMPLE 2

To 47.7 g of 4-tert-octylphenol (purity, 95%) were added 10.6 g of elemental sulfur and 4.4 g of sodium hydroxide.

The resultant suspension was reacted for 2 hours in a nitrogen stream while maintaining the same at 130° C. with stirring.

Subsequently, the reaction mixture was further reacted at 170° C. for 2 hours and then at 250° C. for 3 hours and 30 minutes, during which operation the water and hydrogen sulfide obtained by the reaction were kept being removed. The water distilled off during the reaction amounted to about 1.5 g, while the hydrogen sulfide obtained by the reaction amounted to about 5 g. This reaction mixture was cooled to room temperature, dissolved in 500 ml of ether, and then hydrolyzed with 1N aqueous sulfuric acid solution. The ether layer was separated from the aqueous layer and the ether was removed therefrom by distillation. The reaction mixture thus obtained was subjected to separation by silica gel column chromatography (hexane-chloroform) to obtain a crude reaction product, which was recrystallized from chloroform/acetone. As a result, 2.98 g of 25, 26, 27, 28-tetrahydroxy-5, 11, 17, 23-tetra-tert-octyl-2, 8, 14, 20-tetrathia[$19.3.1.1^{3,7}1^{9,13}1^{15,19}$]octacosa-1(25), 3, 5, 7(28), 9, 11, 13)27), 15, 17, 19)26), 21, 23-dodecaene (II) was obtained as colorless transparent crystals.

This reaction product was the cyclic phenol sulfide represented by formula (1) wherein n=4, X=H, Y=t-octyl, and Z=S.

PRODUCTION EXAMPLE 3

To 3.57 g of cyclic phenol sulfide (I) obtained in Production Example 1, which was represented by formula (1) wherein n=4, X=H, Y=t-butyl, and Z=S, were successively added 25 ml of THF, 0.57 g of sodium carbonate, and 1.2 ml of ethyl bromoacetate. The resultant mixture was heated with refluxing for 45 hours. After the reaction mixture was allowed to cool, the THF was removed and 2N HCl was added. This mixture was extracted with chloroform (80 m×3). The organic layer was washed with water and dried. Thereto was added 300 ml of ethanol. This mixture was heated with refluxing, and the resultant insoluble mater (the cyclic phenol sulfide represented by formula (1) wherein n=4, Y=t-butyl, Z=S, and three of the four X's were each H and the remaining one was CH$_2$COOEt) was removed therefrom by filtration. Thereafter, the ethanol was distilled off, and the residue was purified by column chromatography (ethyl acetate/chloroform) and recrystallization (ethanol) to obtain 2.25 g of a white crystalline powder. This reaction product was the cyclic phenol sulfide represented by formula (1) wherein n=4, Y=t-butyl, Z=S, and two X's facing each other among the four X's were each H and the remaining two facing each other were each CH$_2$COOEt. Properties of this compound are shown below. Melting point: 251.8°–253.0° C. $^1$H-NMR: (δ, ppm, CDCl$_3$) 8.02 (s, 2H, OH), 7.66 (s, 4H, ArH), 6.92 (s, 4H, ArH), 5.29 (s, 4H, OCH$_2$CO), 4.42 (q, Jq=7.2 Hz, 4H, COOCH$_2$, 1.38 (t, Jt=7.2 Hz, 6H, CH$_3$), 1.33 (s, 18H, C(CH$_3$)$_3$), 0.78 (s, 18H, C(CH$_3$)$_3$). IR: (cm$^{-1}$, KBr) ν 3396 (OH), 2963 (CH), 1749 (CO).

Subsequently, 60 ml of ethanol and a potassium hydroxide solution in water (1.16 g/30 ml) were successively added to 1.79 g of the cyclic phenol sulfide. The resultant mixture was heated with refluxing for 3 hours. After the mixture was allowed to cool, 60 ml of 2N aqueous HCl solution was added thereto with cooling with ice. This mixture was heated to room temperature and then continuously stirred for 6 hours. The precipitate generated was taken out by filtration, washed with water, and then recrystallized from acetone/distilled water. As a result, 1.55 g of 5, 11, 17, 23-tetra-tert-butyl-25, 27-bis (carboxymethoxy)-26, 28-dihydroxy- 2, 8, 14, 20-tetrathia[$19.3.1.1^{3,7}1^{9,13}1^{15,19}$]-octacosa-1(25), 3, 5, 7(28), 9, 11, 13(27), 15, 17, 19(26), 21, 23-dodecaene (III) was obtained.

This reaction product (III) was the cyclic phenol sulfide represented by formula (1) wherein n=4, Y=t-butyl, Z=S, and two X's facing each other among the four X's were each H and the remaining two facing each other were each CH$_2$COOH. Properties of this compound are shown below. Decomposition point: 274.5° C. $^1$H-NMR: (67, ppm, CDCl$_3$) 8.28 (br, 2H, OH), 7.67 (s, 4H, ArH), 6.95 (s, 4H, ArH), 5.26 (s, 4H, OCH$_2$CO), 3.01–3.68 (br, 4H, OH), 1.34 (s, 18H, C(CH$_3$)$_3$), 0.80 (s, 18H, C(CH$_3$)$_3$) IR: (cm$^{-1}$, KBr) ν 3391 (OH), 2963 (CH), 1734 (CO)

PRODUCTION EXAMPLE 4

In 30 ml of chloroform was dissolved 1.8 g of cyclic phenol sulfide (I) obtained in Production Example 1, which was represented by formula (1) wherein n=4, X=H, Y=t-butyl, and Z=S. A solution prepared beforehand by dissolving 22.8 g of 30% aqueous hydrogen peroxide in 100 ml of glacial acetic acid was added dropwise to the above solution over a period of 30 minutes at room temperature. This mixture was further stirred at room temperature for 48 hours. To the reaction mixture obtained wan added 150 ml of water. The resultant mixture was extracted with chloroform (50 ml×3). The organic layer was washed with water and then dried with anhydrous magnesium sulfate. The chloroform was distilled off to obtain 740 mg of a white powder, which was sufficiently washed with methanol. As a result, 536 mg of 5, 11, 17, 23-tetra-tert-butyl-25, 26, 27, 28-tetrahydrox-y-2, 8, 14, 20-tetrasulfonyl [$19.3.1.1^{3,7}1^{9,13}1^{15,19}$]octacosa-1(25), 3, 5, 7 (28), 9, 11, 13(27), 15, 17, 19(26), 21, 23-dodocaane (IV) was obtained.

This reaction product (IV) was the cyclic phenol sulfonyl compound represented by formula (1) wherein X=H, Y=t-butyl, n=4, and Z=sulfonyl.

Properties of this compound are shown below. Melting point: 399° C. (decomposition point) $^1$H-NMR: (δ, ppm, Cl$_2$CDCDCl$_2$) 8.05 (s, 8H, ArH), 1.28 (s, 36H, C(CH$_3$)$_3$) $^{13}$C-NMR: (δ, ppm, Cl$_2$CDCDCl$_2$) 155.8, 143.3, 133.6, 128.9 (Ar), 34.9 (C(CH$_3$)$_3$), 31.2 (C(CH$_3$)$_3$) FT-IR: (cm$^{-1}$, KBr) ν 3409 (br, OH), 2996 (s, CH$_3$), 1308, 1164 (s, SO$_2$) Ms (m/z): 849 (M$^+$+1) Elemental analysis % Calculated for C$_{40}$H$_{48}$S$_4$O$_8$: C, 56.58; H, 5.70; S, 15.11 Found: C, 56.3; H, 5.7, S, 14.6

PRODUCTION EXAMPLE 5

In the same manner as in Production Example 1 except for using barium hydroxide instead of sodium hydroxide, 52.3 g of 4-tert-buthylphenol, 22.3 g of elemental sulfur, and 27.6 g of barium hydroxide (octahydrate) were allowed to react for 8 hours, the reaction mixture was hydrolyzed and extracted with other, and then a crude reaction product was obtained by silica gel column chromtography (hexane/chloroform). The crude product was recrystallized from chloroform/acetone. An a result, 1.09 g of 5, 11, 17, 23, 29, 35-hexa-tert-butyl-37, 39, 39, 40, 41, 42-hoxahydroxy-2, 8, 14, 20, 26, 32-hexathia[$31.3.1.1^{3,7}1^{9,13}1^{15,19}1^{21,25}1^{27,31}$]-dotetraconta-1(37), 3, 5, 7(42), 9, 11, 13(41), 15, 17, 19(40), 21, 23, 25(39), 27, 29, 31(38), 33, 35-octadecaene (V) was obtained as a white powder.

This reaction product (V) was the cyclic phenol sulfide represented by formula (1) wherein n=6, X=H, Y=t-butyl, and Z=S.

EXAMPLE 1

Extraction of transition metals with cyclic phenol sulfide (I) (n=4, X=H, Y-t-butyl, Z=S) obtained in Production Example 1, i.e., 5, 11, 17, 23-tetra-tert-butyl-25, 26, 27, 28-tetrahydroxy-2, 8, 14, 20-tetrathia[19.3.1.1$^{3,7}$1$^{9,13}$1$^{5,19}$]octacosa-1(25), 3, 5, 7(28), 9, 11, 13(27), 15, 17, 19(26), 21, 23-dodecaene, was conducted.

In the extraction experiment, 10 ml of an organic phase prepared by dissolving cyclic phenol sulfide (I) (n=4, X=H, Y=t-butyl, Z=S) in chloroform in a concentration of $5.0 \times 10^{-4}$M was placed in a 30-ml screw vial together with 10 ml of an aqueous phase containing transition metal chlorides in an amount of $1.0 \times 10^{-4}$M, and the contents were shaken for 24 hours. The aqueous solution containing transition metals contained 0.1M tetramethylammonium chloride as a salt for regulating ionic strength, and had been regulated so as to have a pH of 8.0 with Tris (tris (hydroxymethyl)-aminomethane)-HCl. In determining the degree of extraction for each metal, the aqueous phase after the shaking was analyzed with an atomic absorption photometer to determine the concentration of ions of the metal remaining therein. The degree of extraction was calculated using the following equation, wherein $[M^+]_{total}$ means the initial concentration of the metal ions and $[M^+]_w$ means the found metal ion concentration In the aqueous phase after the extraction experiment.

Degree of extraction % $= ([M^+]_{total} - [M^+]_w)/[M^+]_{total} \times 100\%$

The results of extraction obtained are shown in Table 1.

TABLE 1

| Transition metal | $Co^{2+}$ | $Ni^{2+}$ | $Cu^{2+}$ | $Zn^{2+}$ | $Mn^{3+}$ |
|---|---|---|---|---|---|
| Degree of extraction (%) | 99 | 97 | 69 | 99 | 35 |

The above results show that cobalt and zinc were extracted almost quantitatively and high degrees of extraction were obtained also for the other metals.

EXAMPLE 2

Extraction of cobalt ions with cyclic phenol sulfide (I) (n=4, X=H, Y=t-butyl, Z=S) was conducted in the presence of pyridine as follows.

Ten milliliters of an organic phase prepared by dissolving cyclic phenol sulfide (I) (n=4, X=H, Y=t-butyl, Z=S) in chloroform in a concentration of $4 \times 10^{-4}$M was mixed with 10 ml of an aqueous phase containing $CoCl_2$ in an amount of $1.0 \times 10^{-4}$M (regulated to pH=6.54 with PIPES (piperazine-N,N'-bis (2-ethanesulfonic acid)-$NH_3$). Then, pyridine was added thereto, and the resultant mixture was shaken.

In Table 2 are shown the addition amounts of pyridine per gram equivalent of the cobalt ions, the shaking periods, and the degrees of extraction. The degrees of extraction were determined through the measurement and calculation shown in Example 1.

The addition of pyridine was effective in attaining higher rates of extraction than in extraction using no pyridine. Specifically, in the case where pyridine was added in an amount of 100 gram equivalents per gram equivalent of the cobalt ions, the degree of extraction in 10-hour shaking reached 90%.

TABLE 2

| Pyridine amount (gram equivalents based on $Co^{2+}$) | Shaking period (hr) | Degree of extraction (%) |
|---|---|---|
| 100 | 5 | 80 |
| 100 | 10 | 90 |
| 10 | 5 | 55 |
| 10 | 10 | 65 |
| nil | 5 | 25 |
| nil | 10 | 40 |

EXAMPLE 3

Extraction of cobalt ions with cyclic phenol sulfide (I) (n=4, X=H, Y=t-butyl, Z=S) was conducted in the presence of tryptophan as follows.

Ten milliliters of an organic phase prepared by dissolving cyclic phenol sulfide (I) (n=4, X=H; Y=t-butyl, Z=S) in chloroform in a concentration of $4 \times 10^{-4}$M was mixed with 10 ml of an aqueous phase containing $CoCl_2$ in an amount of $1.0 \times 10^{-4}$M (regulated to pH=6.52 with PIPES). Thereafter, tryptophan was added thereto, and the resultant mixture was shaken.

In Table 3 are shown the addition amounts of tryptophan, the shaking periods, and the degrees of extraction. The degrees of extraction were determined through the measurement and calculation shown in Example 1. The addition of tryptophan was effective in attaining higher rates of extraction than in extraction using no tryptophan. Specifically, in the case where tryptophan was added in an amount of $5 \times 10^{-3}$M, the degree of extraction already reached 76% in 5-hour shaking.

TABLE 3

| Tryptophane amount | Shaking period (hr) | Degree of extraction (%) |
|---|---|---|
| $5 \times 10^{-3}$ M | 5 | 76 |
| $5 \times 10^{-3}$ M | 10 | 85 |
| $5 \times 10^{-3}$ M | 24 | 92 |
| $5 \times 10^{-4}$ M | 5 | 60 |
| $5 \times 10^{-4}$ M | 10 | 74 |
| $5 \times 10^{-4}$ M | 24 | 90 |
| nil | 5 | 27 |
| nil | 10 | 42 |
| nil | 24 | 67 |

EXAMPLE 4

Extraction of rare earth metals with cyclic phenol sulfide (II), represented by formula (1) wherein n=4, X=H, Y=t-octyl, and Z=S, was conducted.

In the extraction experiment, 10 ml of an organic phase prepared by dissolving cyclic phenol sulfide (II) (n=4, X=H, Y=t-octyl, Z=S) in chloroform in a concentration of $20 \times 10^{-4}$M was placed in a 30-mi vial together with 10 ml of an aqueous phase containing chlorides of rare earth metals in an amount of $1.0 \times 10^{-4}$M, and the contents ware shaken for 24 hours and then subjected to phase separation at 2,000 rpm. The aqueous solution containing rare earth metals contained 0.01M tartaric acid as an auxiliary complexing agent for preventing the formation of hydroxides, and had been regulated so as to have a pH of 10.1 with $NH_3$—HCl. The degrees of extraction were determined through the measurement and calculation shown in Example 1.

The results of extraction obtained are shown in Table 4.

Exceedingly high degrees of extraction were obtained for all rare earth metals except lutetium.

TABLE 4

| Transition metal | $La^{3+}$ | $Pr^{3+}$ | $Eu^{3+}$ | $Gd^{3+}$ | $Lu^{3+}$ |
|---|---|---|---|---|---|
| Degree of extraction (%) | 96 | >99 | 88 | 94 | 41 |

EXAMPLE 5

Extraction of transition metals with cyclic phenol sulfide (III), represented by formula (1) wherein n=4, Y=t-butyl, Z=S, and two X's facing each other among the four X's were each H and the remaining two facing each other were each $CH_2COOH$, was conducted.

The extraction experiment was performed a follows. In the case of rare earth metals, 10 ml of an organic phase prepared by dissolving cyclic phenol sulfide (III) (np32 4, Y=t-butyl, Z=S, and two X's facing each other among the four X's were each H and the remaining two facing each other were each $CH_2COOH$) in chloroform in a concentration of $20 \times 10^{-4}$M was placed in a 30-ml vial together with 10 ml of an aqueous phase containing chlorides of the rare earth metals in an amount of $1.0 \times 10^{-4}$M, and the contents were shaken for 24 hours and then subjected to phase separation at 2,000 rpm. The aqueous solution containing rare earth metals had been regulated so as to have a pH of 5.2 with $CH_3COOH$—$NH_3$.

In the case of metals belonging to the fourth period, 10 ml of an organic phase prepared by dissolving cyclic phenol sulfide (III) (n=4, Y=t-butyl, Z=S, and two X's facing each other among the four X's were each H and the remaining two facing each other were each $CH_2COOH$) in chloroform in a concentration of $5.0 \times 10^{-4}$M was placed in a 30-ml vial together with 10 ml of an aqueous phase containing chlorides of the transition metals in an amount of $1.0 \times 10^{-4}$M, and the contents were shaken for 24 hours. For the aqueous solution containing transition metals, use was made of $CH_3COOR$—$NH_3$, $HNO_3$—$NH_3$, and $H_3PO_4$—$NH_3$ as buffer solutions.

The degrees of extraction were determined through the measurement and calculation shown in Example 1. The results of extraction obtained are shown in Tables 5 and 6.

TABLE 5

| Transition metal | $Pr^{3+}$ | $Eu^{3+}$ | $Yb^{3+}$ |
|---|---|---|---|
| Degree of extraction (%) | >99 | >99 | 99 |

TABLE 6

| Transition metal | | $Fe^{3+}$ | $Co^{2+}$ | $Ni^{2+}$ | $Cu^{2+}$ | $Zn^{2+}$ |
|---|---|---|---|---|---|---|
| Degree of extraction (%) | pH = 5.5 | 93 | 13 | 39 | 96 | 51 |
| | pH = 7.5 | — | 95 | 92 | 96 | 94 |

Exceedingly high degrees of extraction were obtained for the rare earth metals. With respect to the metals belonging to the fourth period, it was found that these metals also were able to be extracted almost quantitatively. Even under strongly acidic conditions, high degrees of extraction were obtained for iron and copper.

EXAMPLE 6

Extraction of rare earth metals with cyclic phenol sulfide (IV), represented by formula (1) wherein n=4, X=H, Y=t-butyl, and Z=$SO_2$, was conducted.

In the extraction experiment, 10 ml of an organic phase prepared by dissolving cyclic phenol sulfide (IV) (n=4, X=H, T=t-butyl, Z=$SO_2$) in chloroform in a concentration of $20 \times 10^{-4}$M was placed in a 30-ml vial together with 10 ml of an aqueous solution containing chlorides of rare earth metals in an amount of $1.0 \times 10^{-4}$M, and the contents were shaken for 24 hours and then subjected to phase separation at 2,000 rpm. The aqueous solution containing rare earth metals contained 0.1M tetramethylammonium chloride as a salt for regulating ionic strength, and had been regulated so as to have a pH of 4. 0 with $CH_3COOH$—$NH_3$.

The degrees of extraction were determined through the measurement and calculation shown in Example 1. The results of extraction obtained are shown in Table 7.

Cyclic phenol sulfide (IV) attained excellent degrees of extraction even under the strongly acidic conditions (pH=4.0).

TABLE 7

| Transition metal | $Pr^{3+}$ | $Eu^{3+}$ | $Yb^{3+}$ |
|---|---|---|---|
| Degree of extraction (%) | 63 | 65 | 77 |

EXAMPLE 7

Extraction of transition metals with cyclic phenol sulfide (V) (n=6, X=H, Y=t-butyl, Z=S) obtained in Production Example 5, i.e., 5, 11, 17, 23, 29, 35-hexa-tert-butyl-37, 38, 39, 40, 41, 42-hexahydroxy-2, 8, 14, 20, 26, 32-hexathia $[31.3.1.1^{3,7}1^{9,13}1^{15,19}1^{21,25}1^{27,31}]$dotetraconta-1(37), 3, 5, 7(42), 9, 11, 13(41), 15, 17, 19(40), 21, 23, 25(39), 27, 29, 31(38), 33, 35-octadecaene (V), was conducted.

In the extraction experiment, 30 ml of an organic phase prepared by dissolving cyclic phenol sulfide (V) (n=6, X=H, Y=t-butyl, Z=S) in chloroform in a concentration of $1.0 \times 10^{-5}$M was placed in a 100-ml screw vial together with 30 ml of an aqueous phase containing chlorides of various transition metals or copper acetate in an amount of 10 ppm, and the contents were shaken for 5 hours. For comparison, an extraction experiment was carried out under the same conditions using a chloroform phase containing no cyclic phenol sulfide (V) and an aqueous phase containing a transition metal at the same concentration, and the degrees of extraction were compared. The degrees of extraction were determined through the measurement and calculation shown in Example 1, and each metal concentration in an aqueous phase after shaking was measured according to ICP-AES (inductively Coupled Plasma-Atomic Emission Spectrometry) method.

As a result, when cyclic phenol sulfide (V) was used, the metal concentrations in the aqueous phase were apparently reduced, as compared with the case where cyclic phenol sulfide (V) was not contained. The reduction ratios of $Cu^{2+}$, $Zn^{2+}$, $CO^{2+}$, and $Ni^{2+}$ were 75%, 33%, 50%, and 33%, respectively.

While the invention has been described in detail and with reference to specific embodiments thereof, it will be apparent to one skilled in the art that various changes and modifications can be made therein without departing from the spirit and scope thereof.

What is claimed is:

1. A method for extracting a transition metal which comprises contacting a material containing the transition metal with a composition which comprises as an active extracting ingredient a cyclic phenol sulfide represented by the following formula (1):

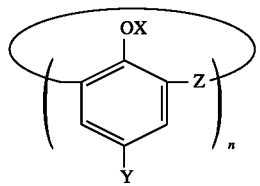

wherein X represents a hydrogen atom, a hydrocarbon group, an acyl group, a carboxyalkyl group, or a carbamoylalkyl group; Y represents a hydrocarbon group; Z represents a sulfide group, a sulfinyl group, or a sulfonyl group; and n is an integer of 4 to 8 to extract the transition metal from the material.

2. The method according to claim 1, wherein said composition for extracting a transition metal further includes an extraction accelerator.

3. The method according to claim 2, wherein the extraction accelerator is a compound which coordinates to transition metal ions and causes the transition metal ions to associate with the cyclic phenol sulfide and which thus functions to increase a rate of complex formation of the cyclic phenol sulfide with the transition metal ions.

4. The method according to claim 2, wherein the extraction accelerator is selected from the group consisting of pyridine, methylpyridine, ethylpyridine, quinoline, and tryptophan.

5. The method according to claim 1, wherein the transition metal is selected from the group consisting of iron, cobalt, nickel, ruthenium, rhodium, palladium, osmium, iridium, platinum, titanium, vanadium, chromium, manganese, copper, zinc, yttrium, zirconium, niobium, molybdenum, silver, cadmium, lanthanum, cerium, neodymium, samarium, europium, gadolinium, terbium, holmium, erbium, thulium, ytterbium, lutetium, hafnium, tantalum, tungsten, gold, mercury, uranium, and plutonium.

6. The method according to claim 1, wherein said extracting in carried out by contacting the composition for extracting a transition metal dissolved in a water-insoluble solvent with the transition metal dissolved in water.

7. A composition for extracting a transition metal which comprises as an active ingredient a cyclic phenol sulfide represented by the following formula (1):

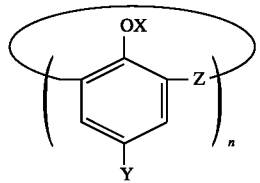

wherein X represents a hydrogen atom, a hydrocarbon group, an acyl group, a carboxyalkyl group, or a carbamoylalkyl group; Y represents a hydrocarbon group; Z represents a sulfide group, a sulfinyl group, or a sulfonyl group; and n is an integer of 4 to 8, and an extraction accelerator selected from the group consisting of basic nitrogen-containing heterocyclic compounds and aromatic amino acids.

8. The composition according to claim 7, wherein X is selected from the group consisting of a hydrogen atom, a carboxyalkyl group and a carbamoylalkyl group.

9. The composition according to claim 7, wherein Y is selected from the group consisting of a tert-butyl group, a neopentyl group, an n-hexyl group, a tert-octyl group, an isononyl group, an n-dodecyl group, a vinyl group, an allyl group, a cyclohexyl group, a methylcyclohexyl group, a phenyl group, a, naphthyl group, a benzyl group and hydrocarbon groups comprising a polymer or copolymer of ethylene, propylene, butylene, acetylene, butadlene, or isoprene.

10. The composition according to claim 7, further comprising a solvent or a carrier.

11. The composition according to claim 7, wherein the transition metal is selected from the group consisting of iron, cobalt, nickel, ruthenium, rhodium, palladium, osmium, iridium, and platinum, titanium, vanadium, chromium, manganese, copper, zinc, yttrium, zirconium, niobium, molybdenum, silver, cadmium, lanthanum, cerium, neodymium, samarium, europium, gadolinium, terbium, holmium, erbium, thulium, ytterbium, lutetium, hafnium, tantalum, tungsten, gold, mercury, uranium, and plutonium.

12. The composition according to claim 7, wherein said extraction accelerator is pyridine, an alkyl pyridine or quinoline.

13. The composition according to claim 12, wherein said alkyl pyridine is methyl pyridine or ethyl pyridine.

14. The composition according to claim 7, wherein said extraction accelerator is tryptophan or phenylalanine.

* * * * *